United States Patent
Yamaura

(10) Patent No.: US 10,615,446 B2
(45) Date of Patent: Apr. 7, 2020

(54) MANIFOLD

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 137 days.

(21) Appl. No.: 15/925,066

(22) Filed: Mar. 19, 2018

(65) Prior Publication Data

US 2018/0287182 A1    Oct. 4, 2018

(30) Foreign Application Priority Data

Mar. 31, 2017    (JP) .................. 2017-071652

(51) Int. Cl.
| | |
|---|---|
| *H01M 8/0267* | (2016.01) |
| *H01M 8/2484* | (2016.01) |
| *H01M 8/04029* | (2016.01) |
| *H01M 8/2485* | (2016.01) |

(52) U.S. Cl.
CPC ....... *H01M 8/2484* (2016.02); *H01M 8/0267* (2013.01); *H01M 8/04029* (2013.01); *H01M 8/2485* (2013.01); *H01M 2250/20* (2013.01); *Y02T 90/32* (2013.01)

(58) Field of Classification Search
CPC ............. H01M 8/2484; H01M 8/0267; H01M 8/2485; H01M 8/04029; H01M 2250/20; Y02T 90/32
See application file for complete search history.

(56) References Cited

U.S. PATENT DOCUMENTS

| | | | | |
|---|---|---|---|---|
| 2011/0076588 A1* | 3/2011 | Yamaura | ........... | H01M 8/04067 429/470 |
| 2011/0081593 A1* | 4/2011 | Yamaura | ........... | H01M 8/04089 429/459 |
| 2012/0034545 A1* | 2/2012 | Yamaura | ............. | H01M 8/2465 429/460 |
| 2013/0017470 A1* | 1/2013 | Hotta | .................. | H01M 8/0267 429/458 |
| 2016/0133953 A1* | 5/2016 | Takeyama | ......... | H01M 8/04104 429/435 |

FOREIGN PATENT DOCUMENTS

JP    2016-091845    5/2016

* cited by examiner

*Primary Examiner* — Alexander Usyatinsky
(74) *Attorney, Agent, or Firm* — Greenblum & Bernstein, P.L.C.

(57) ABSTRACT

A manifold includes an end plate, which has an opposed surface facing an end in a cell stacking direction of a cell stack, a recess, which opens in the opposed surface and forms a flow path, and ribs protruding from the bottom surface of the recess to the opening position of the recess. Portions of a plastic layer that cover the opposed surface and the distal end faces in the protruding direction of the ribs contact the end in the cell stacking direction of the cell stack. The portions of the plastic layer that cover the distal end faces in the protruding direction of the ribs each have a cooling passage, which causes cooling water in the flow path to flow to the space between those portions of the plastic layer and a contact surface of the end in the cell stacking direction of the cell stack.

3 Claims, 3 Drawing Sheets

MANIFOLD

BACKGROUND

The present invention relates to a manifold.

As disclosed in Japanese Laid-Open Patent Publication No. 2016-91845, a fuel cell mounted on a vehicle such as an automobile is equipped with a manifold, which causes fluid, specifically, fuel gas, oxidation gas, and coolant to flow through the cell stack of the fuel cell. The fuel cell is cooled by coolant supplied to and discharged from the cell stack via the manifold, while generating power using fuel gas and oxidation gas supplied to and discharged from the cell stack via the manifold.

Such a manifold has a metal end plate attached to a case of the fuel cell that is provided to surround the cell stack. The end plate has an opposed surface facing an end in the cell stacking direction of the cell stack, a recess, which opens in the opposed surface and forms a flow path through which coolant flows, and ribs protruding from the bottom surface of the recess to the opening position of the recess on the opposed surface. Furthermore, the opposed surface, the recess, and the ribs in the end plate are covered by a plastic layer.

When the end plate is fixed to the case, the portion of the plastic layer that covers the opposed surface and the portions of the plastic layer that cover the distal end faces in the protruding direction of the ribs contact the end in the cell stacking direction of the cell stack. This causes the cell stack to be pressed in the cell stacking direction by the opposed surface, so that a favorable cell stacking structure of the same cell stack is maintained. At this time, the opening of the recess formed in the opposed surface of the end plate is closed by the end in the cell stacking direction of the cell stack, which forms a flow path through which coolant flows in the recess. The end in the cell stacking direction of the cell stack is cooled by the coolant flowing in the flow path.

The fluid in the flow path and the end plate are insulated from each other by a portion of the plastic layer that covers the inner surface of the recess and the outer surfaces of the ribs. The end plate and the cell stack are insulated from each other by the portion of the plastic layer that covers the opposed surface and the portions of the plastic layer that cover the distal end faces in the protruding direction of the ribs.

The end in the cell stacking direction of the cell stack is cooled by the coolant flowing in the flow path in the recess, which is formed in the opposed surface of the end plate. However, the portions of the end that contact portions of the plastic layer that cover the distal end faces in the protruding direction of the ribs do not easily contact the coolant in the flow path and therefore cannot be effectively cooled.

SUMMARY

Accordingly, it is an objective of the present invention to provide a manifold that is capable of effectively cooling an end in the cell stacking direction of a cell stack, specifically, portions of the end that contact portions of a plastic layer that cover the distal end faces in the protruding direction of the ribs.

Means for solving the above-described problem will now be described.

To achieve the foregoing objective, a manifold is provided that is attached to an end in a cell stacking direction of a cell stack in a fuel cell and is used to supply coolant to and discharge coolant from the cell stack. The manifold includes an end plate, which has an opposed surface that faces the end in the cell stacking direction of the cell stack, a recess, which opens in the opposed surface and forms a flow path in which the coolant flows, a rib, which protrudes from a bottom surface of the recess to an opening position of the recess on the opposed surface, and a plastic layer, which is formed to cover the opposed surface, the recess, and the rib. Portions of the plastic layer that cover the opposed surface and a distal end face in a protruding direction of the rib contact the end in the cell stacking direction of the cell stack. The portion of the plastic layer that covers the distal end face in the protruding direction of the rib has a cooling passage that causes coolant in the flow path formed by the recess to flow to a space between that portion of the plastic layer and a contact surface of the end in the cell stacking direction of the cell stack.

DETAILED DESCRIPTION OF THE PREFERRED EMBODIMENTS

A manifold according to one embodiment will now be described with reference to FIGS. 1 to 3.

Figure 1:
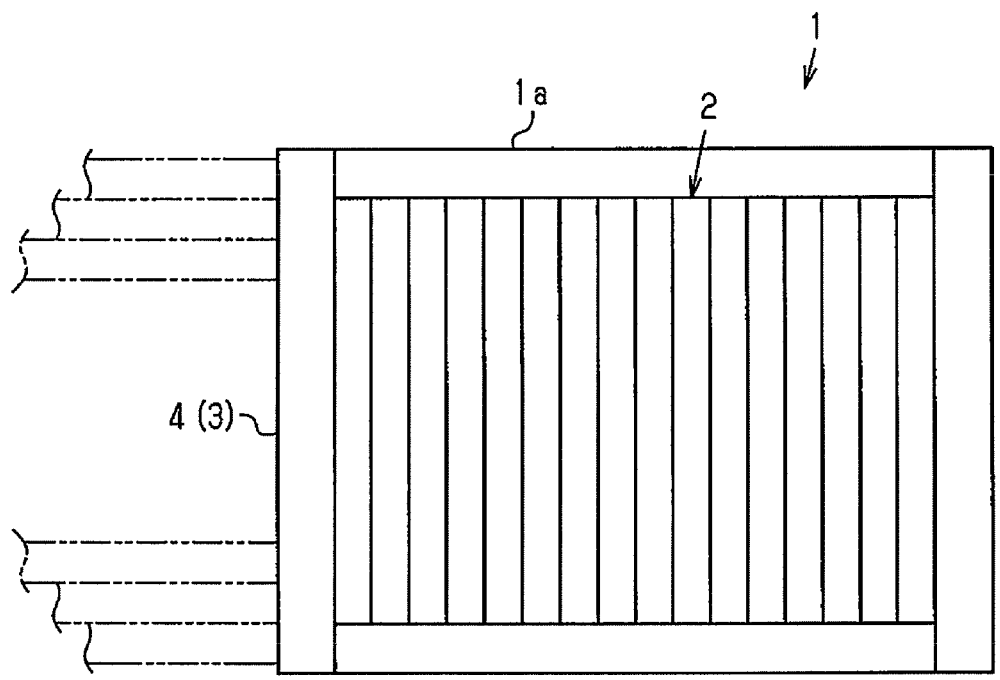
FIG. 1 is a schematic diagram illustrating a way in which a manifold (end plate) is attached to the cell stack of a fuel cell.

As shown in FIG. 1, a fuel cell 1 includes a cell stack 2 and a manifold 3, which is located at an end in the cell stacking direction of the cell stack 2 (the left-right direction in FIG. 1). The manifold 3 is used to cause fluid, specifically hydrogen (fuel gas), air (oxidation gas), and cooling water (coolant) to flow through the cell stack 2. The manifold 3 has a metal end plate 4 attached to a case 1a of the fuel cell 1 that is provided to surround the cell stack 2. The cell stack 2 uses the hydrogen and air supplied and discharged through the manifold 3 to generate power and is cooled by the cooling water supplied and discharged through the manifold 3.

Figure 2:
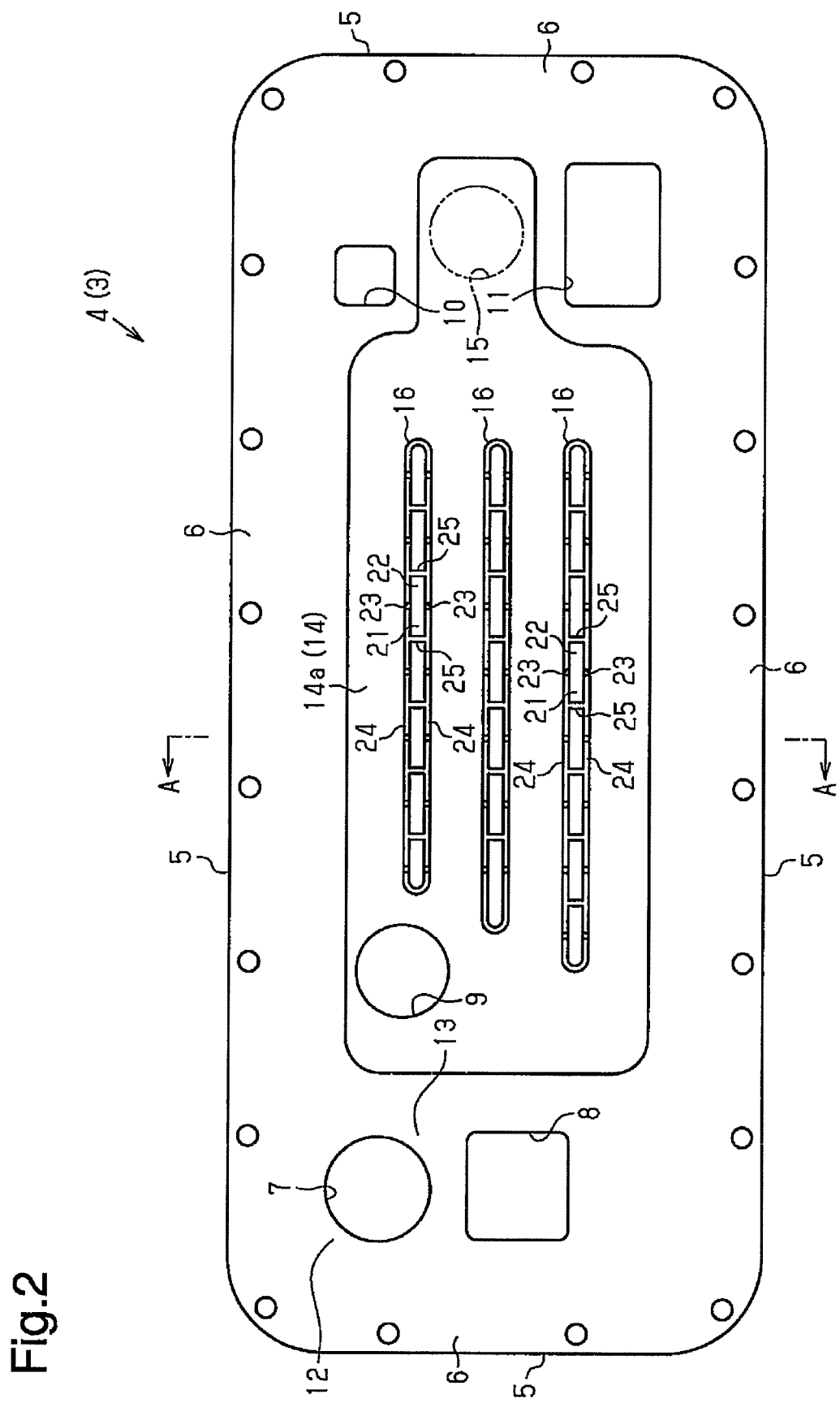
FIG. 2 is a schematic plan view of the manifold of FIG. 1, as viewed from the cell stack.

FIG. 2 schematically shows a state of the manifold 3 (the end plate 4) of FIG. 1 as seen from the cell stack 2. The end plate 4 has the shape of a rectangular plate having a pair of long sides and a pair of short sides. The end plate 4 has on the outer periphery a fastening portion 5 extending along the long sides and the short sides. The end plate 4 is fastened to the case 1a (FIG. 1), for example, with bolts at the fastening portion 5. The surface of the fastening portion 5 on the side facing the cell stack 2 (the surface on the near side of the sheet of FIG. 2) constitutes a mounting surface 6, which is brought into contact with and fixed to the case 1a.

The end plate 4 has holes 7 to 11 in a part surrounded by the fastening portion 5. The holes 7 to 11 extend through the end plate 4 in the thickness direction (the direction orthogonal to the sheet of FIG. 2). The holes 7 to 11 constitute flow paths through which coolant flows. The holes 7, 8, 10, and 11 are open in an opposed surface 12 of the end plate 4, which faces the end in the cell stacking direction of the cell stack 2. Further, the end plate 4 includes a recess 14, which is open in the opposed surface 12 and extends along the opposed surface 12 in the long-side direction of the end plate 4. The hole 9 is opened in a bottom surface 14a of the recess 14 at one end in the long-side direction. The hole 9 and the recess 14 constitute a flow path through which coolant flows.

When the fastening portion 5 of the end plate 4 is fixed to the case 1a (FIG. 1), the flow paths constituted by the holes 7, 8, 10, 11 are connected to the cell stack 2. At this time, the opening of the recess 14 formed in the opposed surface 12 is closed by the end in the cell stacking direction of the cell stack 2, and a flow path through which coolant flows is formed in the recess 14. Further, the other end of the flow path in the recess 14 in the long-side direction is connected to a passage 15 for cooling water formed in the cell stack 2. In the present example, the cooling water flows out from the passage 15 into the flow path in the recess 14, and thereafter, the cooling water flows in the flow path in the direction in which the recess 14 extends and flows out from the hole 9. Therefore, the recess 14 is formed along the opposed surface 12 so as to extend in the flow direction of the cooling water in the flow path in the recess 14.

Multiple ribs 16 protrude from the bottom surface 14a of the recess 14. The ribs 16 are provided at intervals in the direction of the short sides of the end plate 4 and are formed to extend in the same direction as the extending direction of the recess 14. When the fastening portion 5 of the end plate 4 is fixed to the case 1a (FIG. 1), the cell stack 2 is pressed in the cell stacking direction by the opposed surface 12 and the ribs 16, so that a favorable cell stacking structure of the cell stack 2 is maintained. The end plate 4 has a plastic layer 13, which covers the inner surfaces of the holes 7 to 11, the opposed surface 12, the recess 14, and the ribs 16. The plastic layer 13 insulates the fluid in the flow paths formed by the holes 7, 8, 10, and 11 from the end plate 4, and insulates the fluid (cooling water) in the flow path formed by the hole 9 and the recess from the end plate 4.

The plastic layer 13 will now be described.

Figure 3:
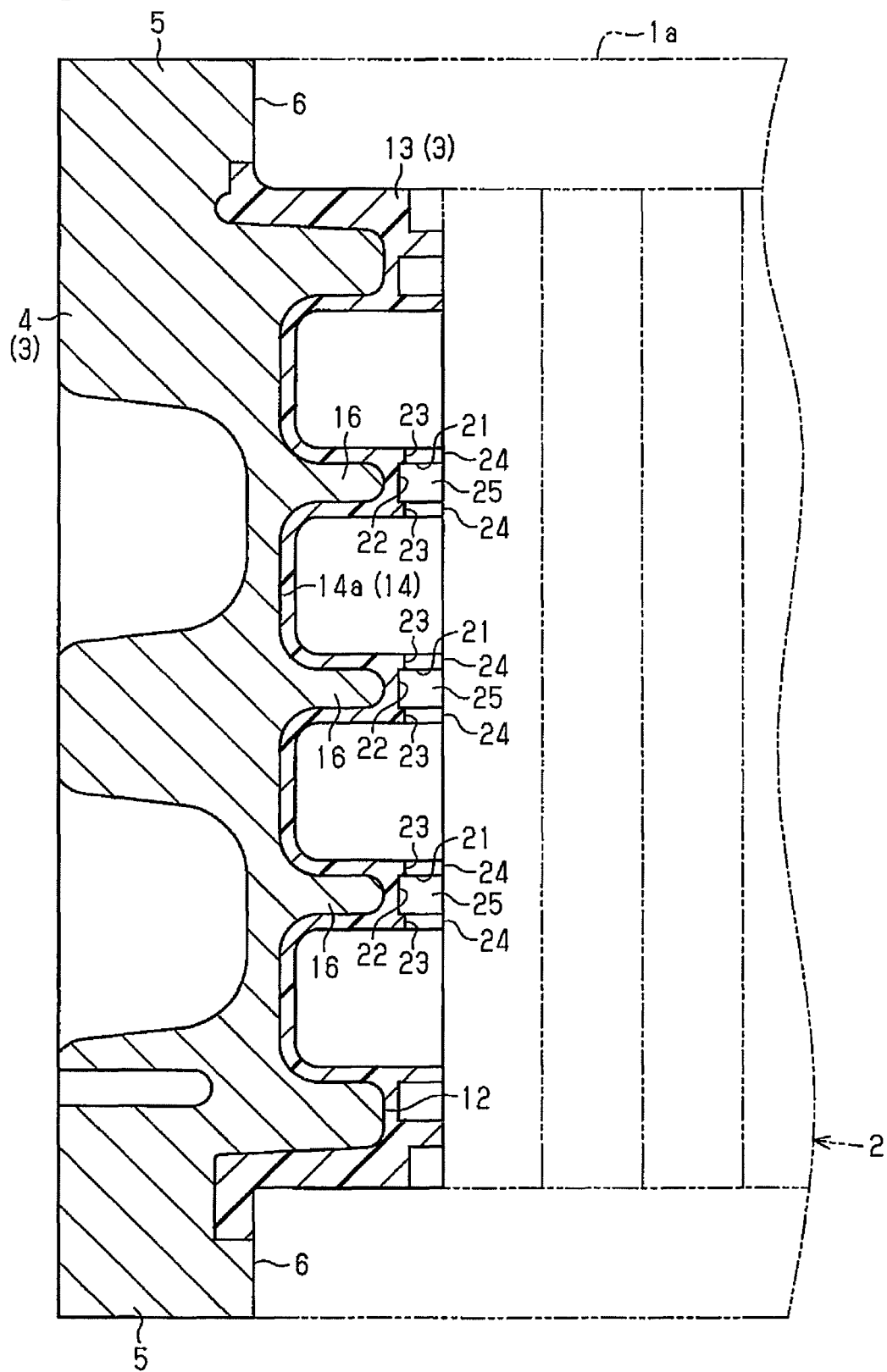
FIG. 3 is a cross-sectional view taken along line A-A of the manifold shown in FIG. 2.

FIG. 3 shows the end plate 4 and the plastic layer 13 in FIG. 2 as seen from the direction of arrows A-A. As can be seen from the drawing, the ribs 16 protrude from the bottom surface 14a of the recess 14 to the opening position of the recess 14 in the opposed surface 12, and the plastic layer 13 is formed to cover the opposed surface 12, the inner surface of the recess 14, and the outer surfaces of the ribs 16. When the mounting surface 6 of the fastening portion 5 of the end plate 4 is brought into contact with and fixed to the case 1a, a portion of the plastic layer 13 that covers the opposed surface 12 and portions of the plastic layer 13 that cover the distal end faces in the protruding direction of the ribs 16 contact the end in the cell stacking direction of the cell stack 2. The end plate 4 and the end in the cell stacking direction of the cell stack 2 are insulated from each other by the portion of the plastic layer 13 that covers the opposed surface 12 and the portions of the plastic layer 13 that cover the distal end faces in the protruding direction of the ribs 16.

The end in the cell stacking direction of the cell stack 2 is cooled by the cooling water flowing in the flow path in the recess 14 formed in the opposed surface 12 of the end plate 4. However, cooling by the cooling water is difficult to perform on the portions of the end that are in contact with the portions of the plastic layer 13 that cover the distal end faces in the protruding direction of the ribs 16. Therefore, the portions of the plastic layer 13 that cover the distal end faces in the protruding direction of the ribs 16 each have a cooling passage 21. The cooling passages 21 cause the cooling water in the flow path formed by the recess 14 to flow to the space between those portions of the plastic layer 13 and a contact surface of the end in the cell stacking direction of the cell stack 2.

Each cooling passage 21 is provided with a lightening portion 22 and cutout portions 23, which are formed in a portion of the plastic layer 13 that covers the distal end face in the protruding direction of the corresponding rib 16. The lightening portion 22 opens toward the end in the cell stacking direction of the cell stack 2 and is formed to extend along the rib 16. The cutout portions 23 allow the lightening portion 22 to communicate with the flow path. Each lightening portion 22 is provided with multiple cutout portions 23

As shown in FIG. 2, the lightening portions 22 are provided between a pair of upright walls 24 extending in parallel with the ribs 16 in the portions of the plastic layer 13 that cover the distal end faces in the protruding direction of the ribs 16. The upright walls 24 of each pair are connected together by a plurality of reinforcing portions 25, which are provided at intervals in the extending direction of the ribs 16. The cutout portions 23 are formed in the upright walls 24 such that multiple cutout portions 23 communicate with each of the lightening portions 22 partitioned by the reinforcing portions 25.

In the present example, in each of the lightening portions 22, which are partitioned by the reinforcing portions 25, the cutout portions 23 are formed at the center of the upright walls 24 in the direction in which the ribs 16 extend.

The operation and advantages of the manifold 3 of the present embodiment will now be described.

(1) After flowing out to the flow path in the recess 14 of the end plate 4 from the passage 15, the cooling water that cools the cell stack 2 flows in the flow path in the direction in which the recess 14 extends and flows out from the hole 9. At that time, the end in the cell stacking direction of the cell stack 2 is cooled by the cooling water. Further, the cooling passages 21 cause the cooling water in the flow path formed in the recess 14 to flow to the space between the portions of the plastic layer 13 that cover the distal end faces in the protruding direction of the ribs 16 and the contact surface of the end in the cell stacking direction of the cell stack 2. In this manner, the cooling water flowing in the cooling passages 21 effectively cools the end in the cell stacking direction of the cell stack 2, that is, the portions of the plastic layer 13 that cover the distal end faces in the protruding direction of the ribs.

(2) The lightening portions 22, which form the cooling passages 21, are formed so as to open toward the end in the cell stacking direction of the cell stack 2 at the portions of the plastic layer 13 that cover the distal end faces in the protruding direction of the ribs 16. The portions of the plastic layer 13 that cover the distal end faces in the protruding direction of the ribs 16 contact the end in the cell stacking direction of the cell stack 2, so that the opening of each lightening portion is closed. The lightening portions 22 communicate with the flow path in the recess 14 through multiple cutout portions 23. Since the thusly formed cooling passages 21 (the lightening portions 22) communicate with the flow path in the recess 14 at a plurality of positions by the cutout portions 23, the cooling water easily flows into the cooling passages 21 from the flow path, and in addition, the cooling water easily flows out to the flow path.

(3) The lightening portions 22 are each provided between a pair of upright walls 24 extending in parallel with the ribs 16 in the portions of the plastic layer 13 that cover the distal end faces in the protruding direction of the ribs 16. The upright walls 24 of each pair are connected together by a plurality of reinforcing portions 25, which are provided at intervals in the extending direction of the ribs 16. Therefore, when the portions of the plastic layer 13 that cover the distal end faces in the protruding direction of the ribs 16 come into contact with the end in the cell stacking direction of the cell stack 2, the reinforcing portions 25, which connect the upright walls 24 together, prevent the upright walls 24 from being folded toward or away from each other. In addition, although the reinforcing portions 25 divide the lightening portions 22 between each pair of the upright walls 24, multiple cutout portions 23 communicate with each of the partitioned lightening portions 22. Thus, it is possible to cause the cooling water flowing through the flow path in the recess 14 to flow in the respective lightening portions.

The above described embodiment may be modified as follows.

In the above-described embodiment, in each of the lightening portions 22, which are partitioned by the reinforcing portions 25, the cutout portions 23 are formed at the center of the upright walls 24 in the direction in which the ribs 16 extend. However, the positions of the cutout portions 23 may be changed in the extending direction of the ribs 16 as necessary. For each of the lightening portions 22 partitioned by the reinforcing portions 25, one cutout portion 23 may be formed at one end in the extending direction of the rib 16 of one of the upright walls 24 in each pair, and another cutout portion 23 may be formed at the other end in the extending direction of the rib 16 of the other upright wall 24.

Instead of forming a cutout portion 23 in each upright wall 24 of each pair, multiple cutout portions 23 may be formed in one of the upright walls 24 of each pair.

The reinforcing portions 25 do not necessarily have to be provided.

The invention claimed is:

1. A manifold that is attached to an end in a cell stacking direction of a cell stack in a fuel cell and is used to supply coolant to and discharge coolant from the cell stack, the manifold comprising:
   an end plate, which has an opposed surface that faces the end in the cell stacking direction of the cell stack;
   a recess, which opens in the opposed surface and forms a flow path in which the coolant flows;
   a rib, which protrudes from a bottom surface of the recess to an opening position of the recess on the opposed surface; and
   a plastic layer, which is formed to cover the opposed surface, the recess, and the rib, wherein portions of the plastic layer that cover the opposed surface and a distal end face in a protruding direction of the rib contact the end in the cell stacking direction of the cell stack,
   wherein the portion of the plastic layer that covers the distal end face in the protruding direction of the rib has a cooling passage that causes coolant in the flow path formed by the recess to flow to a space between that portion of the plastic layer and a contact surface of the end in the cell stacking direction of the cell stack, and
   wherein the cooling passage includes, in the portion of the plastic layer that covers the distal end face in the protruding direction of the rib:
      a lightening portion, which opens toward the end in the cell stacking direction of the cell stack, and
      a plurality of cutout portions, which allows the lightening portion to communicate with the flow path.

2. The manifold according to claim 1, wherein
the recess is formed along the opposed surface so as to extend in a flow direction of the coolant in the flow path in the recess,
the rib is formed to extend in the same direction as a direction in which the recess extends, and
the lightening portion is formed to extend along the rib.

3. The manifold according to claim 2, wherein
the lightening portion is provided between a pair of upright walls extending in parallel with the rib in the portion of the plastic layer that covers the distal end face in the protruding direction of the rib,
the upright walls are connected together by a plurality of reinforcing portions, which are provided at intervals in an extending direction of the rib,
the lightening portion is one of a plurality of lightening portions partitioned by the reinforcing portions, and
the cutout portions are formed in the upright walls such that two or more of the cutout portions communicate with each of the lightening portions.

* * * * *